United States Patent
Cho et al.

(10) Patent No.: US 11,757,091 B2
(45) Date of Patent: Sep. 12, 2023

(54) SULFUR-CARBON COMPOSITE MANUFACTURING METHOD, SULFUR-CARBON COMPOSITE MANUFACTURED THEREBY, CATHODE COMPRISING SAME SULFUR-CARBON COMPOSITE, AND LITHIUM SECONDARY BATTERY COMPRISING SAME CATHODE

(71) Applicant: LG ENERGY SOLUTION, LTD., Seoul (KR)

(72) Inventors: Eunkyung Cho, Daejeon (KR); Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/745,047

(22) Filed: May 16, 2022

(65) Prior Publication Data
US 2023/0013446 A1 Jan. 19, 2023

Related U.S. Application Data

(62) Division of application No. 17/041,989, filed as application No. PCT/KR2019/011956 on Sep. 17, 2019, now Pat. No. 11,362,325.

(30) Foreign Application Priority Data

Sep. 19, 2018 (KR) .................. 10-2018-0111953

(51) Int. Cl.
*H01B 1/04* (2006.01)
*H01M 4/36* (2006.01)
(Continued)

(52) U.S. Cl.
CPC .............. *H01M 4/364* (2013.01); *H01B 1/04* (2013.01); *H01M 4/38* (2013.01); *H01M 4/587* (2013.01);
(Continued)

(58) Field of Classification Search
CPC .......... H01B 1/00; H01B 1/04; H01M 4/364; H01M 4/38; H01M 4/587; H01M 4/625; C01B 17/02; C01B 32/168
See application file for complete search history.

(56) References Cited

U.S. PATENT DOCUMENTS

2013/0161557 A1* 6/2013 Chung ................ H01M 4/1397
252/182.1
2013/0164635 A1 6/2013 Schmidt
(Continued)

FOREIGN PATENT DOCUMENTS

CN 101478061 A 7/2009
CN 103022500 A 4/2013
(Continued)

OTHER PUBLICATIONS

Rao et al. "Carbon nanofiber-sulfur composite cathode materials with different binders for secondary Li/S cells", Electrochimica Acta 65 (2012) 228-233.*
(Continued)

*Primary Examiner* — Mark Kopec
(74) *Attorney, Agent, or Firm* — Birch, Stewart, Kolasch & Birch, LLP

(57) ABSTRACT

A method for preparing a sulfur-carbon composite including the steps of: (a) mixing a carbon-based material with sulfur or a sulfur compound; (b) placing the sulfur-carbon mixture mixed in step (a) and a liquid which is vaporizable into a sealable container; and (c) heating the sealed container to a temperature of 120 to 200° C.; a positive electrode for a lithium secondary battery including the sulfur-carbon composite prepared by the above method, and a lithium secondary battery including the above positive electrode.

5 Claims, 2 Drawing Sheets

(51) Int. Cl.
  *H01M 4/38*       (2006.01)
  *H01M 4/587*      (2010.01)
  *H01M 4/62*       (2006.01)
  *H01M 10/0525*    (2010.01)
  *H01M 4/02*       (2006.01)

(52) U.S. Cl.
  CPC ....... *H01M 4/625* (2013.01); *H01M 10/0525* (2013.01); *H01M 2004/028* (2013.01)

(56) References Cited

U.S. PATENT DOCUMENTS

| | | | |
|---|---|---|---|
| 2014/0255786 A1 | 9/2014 | Oh et al. | |
| 2015/0357634 A1 | 12/2015 | Sun et al. | |
| 2016/0190558 A1* | 6/2016 | Niu | H01M 4/625 |
| | | | 252/511 |
| 2016/0240841 A1* | 8/2016 | He | H01M 4/625 |
| 2017/0317340 A1* | 11/2017 | Nishikawa | H01M 4/622 |
| 2018/0159121 A1 | 6/2018 | Guo et al. | |
| 2018/0175375 A1 | 6/2018 | Lecuyer et al. | |
| 2019/0148716 A1 | 5/2019 | Zhang et al. | |

FOREIGN PATENT DOCUMENTS

| | | | |
|---|---|---|---|
| CN | 104201339 A | 12/2014 | |
| CN | 105047861 A | 11/2015 | |
| CN | 105304882 A | 2/2016 | |
| CN | 105552345 A | 5/2016 | |
| CN | 105655549 A | 6/2016 | |
| CN | 105826523 A | 8/2016 | |
| CN | 106159221 A | 11/2016 | |
| CN | 107887590 A | 4/2018 | |
| EP | 3 457 474 A1 | 3/2019 | |
| HR | 10-2015-0014793 A | 2/2015 | |
| JP | 2013-527579 A | 6/2013 | |
| JP | 2013-137981 A | 7/2013 | |
| JP | 2013-191329 A | 9/2013 | |
| KP | 1820867 B1 | 3/2018 | |
| KR | 10-2014-0111516 A | 9/2014 | |
| KR | 10-2018-007796 A | 2/2018 | |
| KR | 10-2018-0017975 A | 2/2018 | |
| KR | 10-2018-0042157 A | 4/2018 | |
| WO | WO 2013049663 | * | 4/2013 |
| WO | WO 2018/030616 A1 | 2/2018 | |

OTHER PUBLICATIONS

Fang et al. "Single-wall carbon nanotube network enabled ultrahigh sulfur-content electrodes for high-performance lithium-sulfur batteries", Nano Energy 42 (2017) 205-214.*
Wang et al. "Advanced engineering of nanostructured carbons for lithium-sulfur batteries", Nano Energy (2-15) 15, 413-444.*
Yuan et al "Improvement of cycle property of sulfur-coated multi-walled carbon nanotubes composite cathode fort lithium/sulfur batteries", Journal of Power Sources 189 (2009) 1141-1146.*
Jin et al "Sulfur/Carbon Nanotube Composite Film as a Flexible Cathode for Lithium-Sulfur Batteries", Journal of Physical Chemistry C, 2013, 117, 21112-21119.*
Chen et al., "The preparation of nano-sulfur/MWCNTs and its electrochemical performance", Electrochimica Acta, vol. 55, No. 27, Nov. 30, 2010, pp. 8062-8066.
English language machine translation of CN 103022500 (pub date Apr. 2013).
English language machine translation of KR 10-2015-0014793 (pub date Feb. 2015).
European Search Report for Appl. No. 19861616.1 dated May 28, 2021.
International Search Report for PCT/KR2013/011956 dated Dec. 20, 2013.
Liu et al. "Synthesis and electrochemical performance of micro-mesoporous carbon-sulfur composite cathode for Li-S batteries", Ionics (2017) 23: 2951-2360.
Liu et al. "Wet ball-milling synthesis of high performance sulfur-based composite cathode: The influences of solvents and ball milling speed", Eleotrochimica Acta 149 (2014) 136-143.
Sun et al. "A high-rate lithium-sulfur battery assisted by nitrogen= enriched mesoporous carbons decorated with ultrafine $La_2O_3$ nanoparticles", J. Mater. Chem. A, 2013, 1, 13283-89.
Wang et al., "Pitaya-Like Carbon Nanofiber Sulfur Composites as Promising Cathode Materials for High-Performance Li-S Batteries", Int. J. Electrochem. Sci., Aug. 5, 2018, vol. 13, pp. 8388-8335.
Wang et al., "Preparation and performance of a core-shell carbon/suifur material for lithium/sulfur battery," Electrochimica Acta, vol. 55, 2010 (published online Jun. 30, 2010), pp. 7010-7015.

* cited by examiner

[Figure 1]
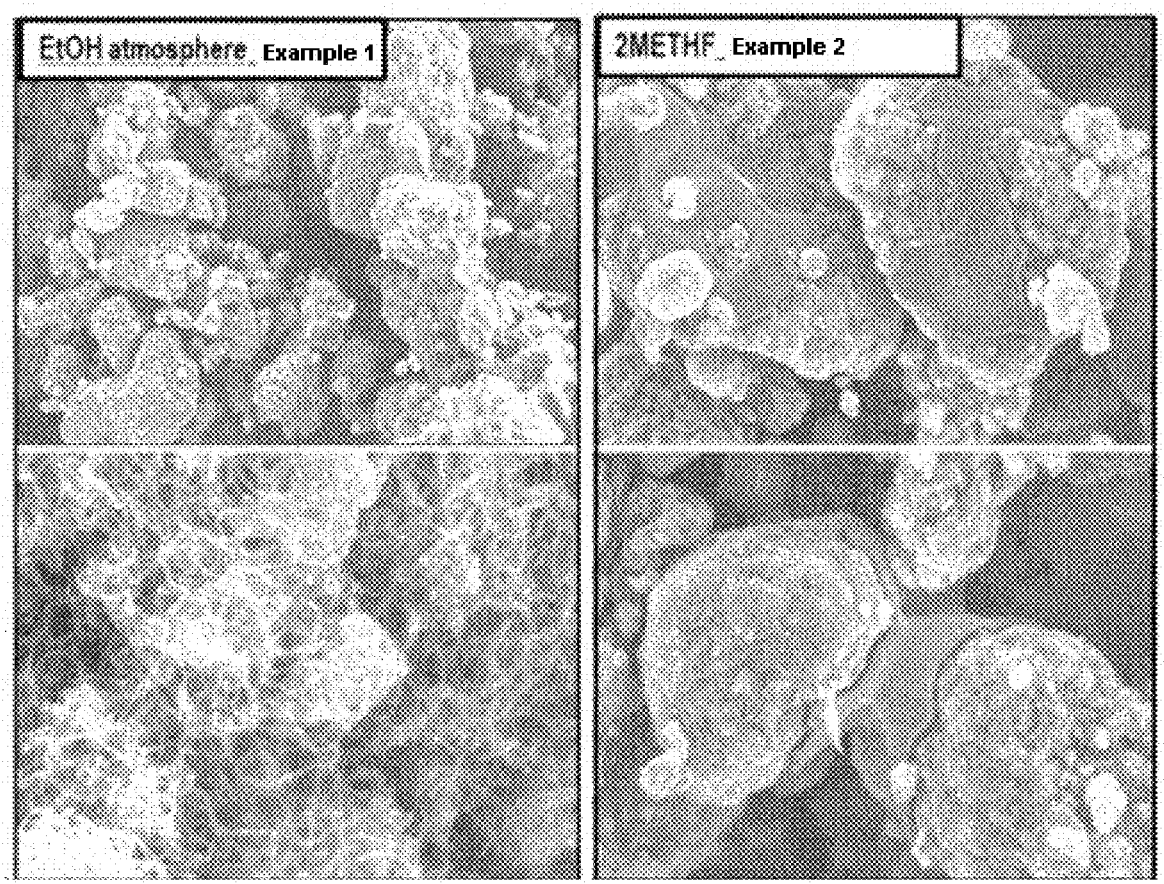

[Figure 2]
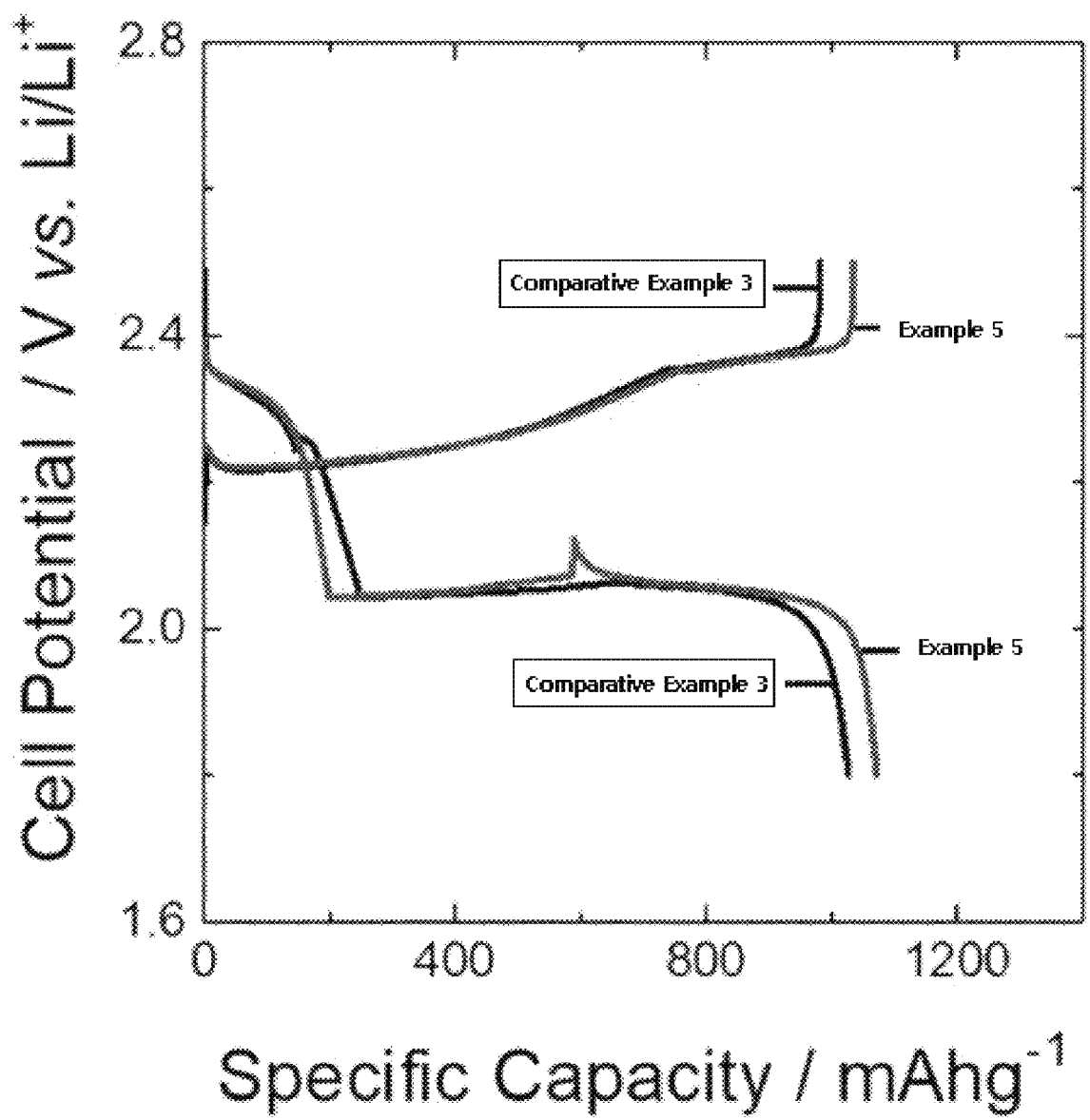

SULFUR-CARBON COMPOSITE MANUFACTURING METHOD, SULFUR-CARBON COMPOSITE MANUFACTURED THEREBY, CATHODE COMPRISING SAME SULFUR-CARBON COMPOSITE, AND LITHIUM SECONDARY BATTERY COMPRISING SAME CATHODE

This application is a Divisional of U.S. application Ser. No. 17/041,989 filed on Sep. 25, 2020 (now U.S. Pat. No. 11,362,325 issued on Jun. 14, 2022), which is the National Phase of PCT International Application No. PCT/KR2019/011956 filed on Sep. 17, 2019, which claims the benefit of priority based on Korean Patent Application No. 10-2018-0111953 filed on Sep. 19, 2018, the entire contents of which are incorporated herein by reference.

TECHNICAL FIELD

The present invention relates to a preparation method of a sulfur-carbon composite, a sulfur-carbon composite prepared by the same, a positive electrode comprising the above sulfur-carbon composite, and a lithium secondary battery comprising the above positive electrode.

BACKGROUND ART

Recently, as portable electronic devices, electric vehicles, large-capacity power storage systems and the like have been developed, the need for large-capacity batteries is increasing. The lithium-sulfur battery is a secondary battery using a sulfur-based material having a sulfur-sulfur bond (S—S bond) a positive electrode active material and using lithium metal as a negative electrode active material. The lithium-sulfur battery has advantages in that sulfur, which is the main material of the positive electrode active material, is very rich in resources, is not toxic, and has a low atomic weight.

In addition, theoretical discharge capacity of the lithium-sulfur battery is 1672 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—$MnO_2$ battery: 1,000 Wh/kg, Na—S battery: 800 Wh/kg), the lithium-sulfur battery is attracting attention as a battery having high energy density characteristics.

Sulfur is used as a positive electrode active material for a lithium-sulfur battery, but sulfur is a non-conductor, thereby making it difficult to transport electrons generated by electrochemical reactions, and thus in order to compensate for this, a sulfur-carbon composite complexed with carbon which is a conductive material is generally used.

The sulfur-carbon composite is manufactured by mixing sulfur and carbon-based material and heating to melt the sulfur (melt diffusion process) so that the sulfur is combined with the carbon-based material by coating, penetration and the like.

In order for the sulfur-carbon composite to exhibit excellent activity as a positive electrode active material of a lithium-sulfur battery, it is important that the sulfur is thinly and uniformly coated on the surface of the carbon-based material.

However, a highly reproducible preparation method of sulfur-carbon composites for thinly and uniformly coating sulfur on the surface of carbon-based materials has not been established yet.

PRIOR ART DOCUMENT

Patent Document

Korean Laid-open Patent Publication No. 10-2018-0017796

DISCLOSURE

Technical Problem

As a result of intensively studying the challenges of the prior art as described above, the inventors of the present application have found that when forming a specific reaction atmosphere in the melting process of sulfur (melt diffusion process), sulfur is thinly and evenly coated on the surface of the carbon-based material, thereby completing the present invention.

Therefore, it is an object of the present invention to provide a method for preparing a sulfur-carbon composite, which enables sulfur to be coated thinly and uniformly on the surface of a carbon-based material.

In addition, it is another object of the present invention to provide a sulfur-carbon composite which is prepared by said method and is capable of providing improved initial capacity to the battery, a positive electrode comprising said sulfur-carbon composite, and a lithium secondary battery comprising said positive electrode.

Technical Solution

In order to achieve the above objects, the present invention provides a method for preparing a sulfur-carbon composite comprising the steps of:

(a) mixing a carbon-based material with sulfur or a sulfur compound to prepare a sulfur-carbon mixture;

(b) placing the sulfur-carbon mixture mixed in step (a) and a liquid which is vaporizable into a sealable container; and (c) heating the sealed container to a temperature of 120 to 200° C. to vaporize the liquid and prepare the sulfur-carbon composite.

In addition, the present invention provides a sulfur-carbon composite prepared by the above method.

In addition, the present invention provides a positive electrode for a lithium secondary battery comprising the sulfur-carbon composite.

In addition, the present invention provides a lithium secondary battery comprising a positive electrode for a lithium secondary battery, a negative electrode, a separator, and an electrolyte.

Advantageous Effects

According to the preparation method of the sulfur-carbon composite of the present invention, the present invention provides the effect of allowing a thin and uniform coating of sulfur on the surface of a carbon-based material by a simple method.

In addition, the sulfur-carbon composite prepared by the above method or the positive electrode comprising same allows the lithium secondary battery comprising it to exhibit an improved initial capacity by comprising a composite formed by coating sulfur on the surface of a carbon-based material thinly and uniformly.

DESCRIPTION OF DRAWINGS

FIG. 1 is a SEM photograph of the structure of the sulfur-carbon composite prepared in Example 1 and Example 2 of the present invention (Experimental Example 1).

FIG. 2 is a graph showing the results of the initial capacity test of the lithium-sulfur batteries prepared in Example 5 and Comparative Example 3 of the present invention (Experimental Example 2).

BEST MODE

Hereinafter, exemplary embodiments of the present invention will be described in detail with reference to the accompanying drawings, so that those skilled in the art to which the present invention pertains may easily carry out the present invention. However, the present invention can be implemented in many different forms and is not limited to the embodiments described herein.

The present invention relates to a method for preparing a sulfur-carbon composite comprising the steps of:

(a) mixing a carbon-based material with sulfur or a sulfur compound to prepare a sulfur-carbon mixture;

(b) placing the sulfur-carbon mixture mixed in step (a) and a liquid which is vaporizable into a sealable container; and (c) heating the sealed container to a temperature of 120 to 200° C. to vaporize the liquid and prepare the sulfur-carbon composite.

The method of the present invention is described below for each step.

Step (a)

In the present invention, step (a) is performed by the same method as is commonly used in the art. Therefore, step (a) is not particularly limited and known methods in the art may be employed without limitation.

The carbon-based material and sulfur or sulfur compound are preferably mixed in a weight ratio of 1:1 to 1:9. If the content of sulfur component is less than the above range, the amount of active material is insufficient to be used as a positive electrode active material. If the carbon-based material is less than the above range, the electrical conductivity of the sulfur-carbon composite is not sufficient. Therefore, the above weight ratio is appropriately adjusted within the above range.

The mixing of the carbon-based material and sulfur or a sulfur compound may be performed using, for example, a ball mill, but is not limited thereto.

The carbon-based material may be one that can impart conductivity to sulfur which is an insulator. Specifically, the carbon-based material may be at least one selected from the group consisting of carbon nanotubes, graphene, graphite, amorphous carbon, carbon black, activated carbon, and the like. Among these, carbon nanotubes, graphite, and carbon black are more preferable in terms of excellent electrical conductivity, specific surface area, and capacity for supporting sulfur.

The carbon nanotubes (CNT) may be single-walled carbon nanotubes (SWCNT) or multi-walled carbon nanotubes (MWCNT). It is preferable that the diameter of the said CNT is 1 to 200 nm, it is more preferable that the diameter of the said CNT is 1 to 100 nm, and it is most preferable that the diameter of the said CNT is 1 to 50 nm. If the diameter of the CNT exceeds 200 nm, there is a problem that the specific surface area is reduced and thus the reaction area with the electrolyte solution is reduced.

The graphite may be at least one of artificial graphite and natural graphite. The natural graphite comprises flake graphite, high crystalline graphite, and microcrystalline (microcrystalline or cryptocrystalline; amorphous) graphite. The artificial graphite comprises primary or electrographite, secondary graphite, graphite fiber, and the like. The graphite particles may be used alone or in combination of two or more kinds of the above-described graphite type.

The graphite particles are not particularly limited as long as the graphite particles are capable of reversibly intercalating and de-intercalating lithium ions during charging and discharging. For example, the graphite particles may have an interplanar spacing of planes by X-ray wide-angle diffraction, for example, 0.335 nm or more and less than 0.337 nm.

In addition, the size of the graphite particles is preferably selected in terms of improving the mixing uniformity and mixture density. For example, the average particle diameter of the graphite particles may be 20 μm or less, specifically 0.1 to 20 μm or less, and more specifically 0.1 to 10 μm, 1 to 10 μm, or 1 to 5 μm.

The carbon black may be, for example, at least one selected from the group consisting of acetylene black, Ketjen black, furnace black, oil-furnace black. Columbia carbon, channel black, lamp black, and thermal black. The particle size of the carbon black is not limited, but the average particle diameter is preferably 0.01 to 0.5 μm in terms of securing the reaction area with the electrolyte solution.

Known components may be used as the sulfur or sulfur compound. As the sulfur, inorganic sulfur or elemental sulfur ($S_8$) may be preferably used.

Step (b)

The sealing container in step (b) is not particularly limited, and all known in the art may be employed. For example, in the case where the oven or the like as a heating device can provide a sealed space, step b) may be carried out in the oven without the need for a separate sealed container. In addition, step b) may also be carried out using a sealable container made of a variety of sealable materials, for example polymers, stainless or the like.

The vaporizable liquid in step (c) is preferably added to 10 to 300 parts by weight based on 100 parts by weight of sulfur-carbon mixture. If the liquid is added below the above-mentioned range, it is difficult to achieve the desired effect. If the liquid is added in excess of the above-mentioned range, it is not preferable because it may adversely affect other physical properties of the sulfur-carbon composite.

As the liquid vaporizable in step (c), one or more selected from substituted or unsubstituted tetrahydrofuran, substituted or unsubstituted alcohol, water, and the like may be used.

The substituted or unsubstituted tetrahydrofuran may be 2-methyltetrahydrofuran, and the like. The substituted or unsubstituted alcohol may be a lower alcohol such as methanol, ethanol, propanol or butanol. Among these, ethanol can be used preferably.

Step (c)

The time for heating the sealed container to a temperature of 120 to 200° C. in step (c) may be 10 minutes to 3 hours, preferably 20 minutes to 1 hour.

However, since the heating temperature and the heating time are for melting the sulfur component so that the component can be evenly coated on the carbon-based material, the heating temperature and the heating time are not particularly limited insofar as these objects are satisfied.

In addition, the heating temperature of the sealed container in step (c) may be 120 to 200° C., more preferably 120 to 160° C.

As described in detail above, the preparation method of sulfur-carbon composite of the present invention can be carried out by employing a method known in the art, unlike the prior art, except for changing the melting atmosphere of the sulfur component using the vaporizable liquid in step (c).

In the sulfur-carbon composite prepared by the method of the present invention, the sulfur component is more thinly coated on the surface of the carbonaceous material, so that a better initial capacity is achieved.

In addition, the present invention relates to a sulfur-carbon composite prepared by the method of the present invention, and a positive electrode comprising the sulfur-carbon composite.

The sulfur-carbon composite, as shown in FIG. 1, forms a different structure from the sulfur-carbon composite by the conventional method. In addition, since the sulfur component is more thinly coated on the surface of the carbonaceous material, the battery comprising the same can exhibit a better initial capacity.

The above positive electrode also provides the same effect.

In addition, the present invention provides a lithium secondary battery comprising a positive electrode for a lithium secondary battery comprising the sulfur-carbon composite, a negative electrode, a separator, and an electrolyte.

The lithium-secondary battery according to the present invention comprises a positive electrode and a negative electrode, and an electrolyte present between them, wherein the positive electrode is a positive electrode comprising sulfur-carbon composite according to the present invention. In this case, the battery may further comprise a separator interposed between the positive electrode and the negative electrode.

The configuration of the negative electrode, the separator, and the electrolyte is not particularly limited in the present invention, and is as known in the art.

Hereinafter, as an example of the lithium secondary battery of the present invention, each configuration of the battery will be described in detail based on a lithium-sulfur battery.

Sulfur-Carbon Composite

The sulfur-carbon composite comprises sulfur which is a non-conductive material and a carbon-based material which has electrical conductivity, thereby being used as a positive electrode active material for a lithium-sulfur battery.

In the case of the lithium-sulfur battery, during the discharging, as the sulfur-sulfur bond (S—S bond) of sulfur-based compounds is cut off, the oxidation number of S decreases, and during the charging, as the S—S bond is re-formed, the oxidation number of S increases. The electrical energy is generated by this oxidation-reduction reaction.

The complexing method of the sulfur-carbon composite of the present invention is not particularly limited in the present invention and a method commonly used in the art may be used, except for the complexing atmosphere of sulfur and the carbon-based material corresponding to the technical feature of the present invention. For example, a method of simply mixing the carbon-based materials and sulfur and then heat-treating them to complex them may be used.

The sulfur-carbon composite proposed in the present invention may be complexed by simple mixing of sulfur and a carbon-based material or may have a coating form or a supporting form of a core-shell structure. The form of the coating of the core-shell structure is a form in which any one of sulfur and carbon-based materials is coated with the other one, and for example, a form in which the surface of the carbon-based material may be wrapped by sulfur or vice versa. In addition, if the carbon-based material is porous, the supported form may be a form in which sulfur is supported inside the carbon-based material. The form of the sulfur-carbon composite may be used in any form as long as it satisfies the content ratio of sulfur and carbon-based material as described above.

The diameter of the sulfur-carbon composite is not particularly limited in the present invention, but may vary, preferably 0.1 to 20 um, more preferably 1 to 10 um. When satisfying the above range, there is an advantage of being able to manufacture a high loading electrode.

Positive Electrode

The positive electrode for the lithium-sulfur battery includes an active material layer formed on a current collector, and the active material layer includes a sulfur-carbon composite prepared by the present invention, an electrically conductive material, a binder, and other additives.

The electrode current collector serves to transfer electrons from the outside to cause an electrochemical reaction in the active material, or serves as a passage for receiving electrons from the active material and flowing them to the outside, and is not particularly limited as long as it has electrical conductivity without causing chemical changes in the battery. For example, copper, stainless steel, aluminum, nickel, titanium, sintered carbon; copper or stainless steel surface-treated with carbon, nickel, titanium, silver or the like; aluminum-cadmium alloy or the like may be used. In addition, the electrode current collector can have minute irregularities formed on its surface to enhance the bonding force with the active material, and may be formed in various forms such as film, sheet, foil, net, porous body, foam, nonwoven fabric or the like.

The electrically conductive material is not particularly limited as long as it is electrically conductive without causing chemical changes in the relevant battery. Examples of the electrically conductive material may comprise graphite such as natural graphite and artificial graphite; carbon blacks such as carbon black, acetylene black, Ketjen black, Denka black, channel black, furnace black, lamp black, and thermal black; graphene; carbon fibers such as carbon nanotubes (CNT) and carbon nanofibers (CNF), or electrically conductive fibers such as metal fibers; metal powders such as carbon fluoride powder, aluminum powder, and nickel powder; electrically conductive whiskers such as zinc oxide and potassium titanate; electrically conductive metal oxides such as titanium oxide; polyphenylene derivatives and the like.

The binder is added for bonding of the active material and the electrically conductive material and for bonding of the active material and the current collector. The binders may comprise thermoplastic resins or thermosetting resins. As a binder, for example, polyethylene, polypropylene, polytetrafluoro ethylene (PTFE), polyvinylidene fluoride (PVDF), styrene-butadiene rubber (SBR), tetrafluoroethylene-perfluoro alkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoro propylene copolymer, propylene-tetrafluoroethylene copolymer, ethylene-chlorotrifluoro ethylene copolymer, vinylidene fluoride-hexafluoropropylene-tetrafluoroethylene copolymer, vinylidene fluoride-perfluoromethylvinylether-tetrafluoro ethylene copolymer and ethylene-acrylic copolymer, etc. can be used alone or in combination, but it is not necessarily limited to these and any one that can be used as a binder in the art can be used.

The positive electrode for the lithium-sulfur battery of the present invention can be produced by the conventional method. Specifically, the positive electrode is prepared by applying a composition for forming the active material layer prepared by mixing the sulfur-carbon composite of the present invention, which is an active material, the electrically conductive material, and the binder in an organic solvent, on the current collector, drying it, and optionally compressing and molding it onto the current collector for the purpose of improving the density of the electrode. At this time, it is preferable to use an organic solvent which can uniformly disperse the positive electrode active material, the binder, and the electrically conductive material, and is easily evaporated. Specifically, N-methyl-2-pyrrolidone, acetonitrile, methanol, ethanol, tetrahydrofuran, water, isopropyl alcohol and the like may be comprised.

Negative Electrode

The negative electrode according to the present invention includes a negative electrode active material formed on the negative electrode current collector.

The negative electrode current collector may be specifically selected from the group consisting of copper, stainless steel, titanium, silver, palladium, nickel, alloys thereof, and combinations thereof. The stainless steel can be surface-treated with carbon, nickel, titanium, or silver, and the alloy may be an aluminum-cadmium alloy. In addition to these, sintered carbon, a nonconductive polymer the surface of which is treated with an electrically conductive material, or an electrically conductive polymer, etc. may be used.

The negative electrode active material may comprise a material capable of reversibly intercalating or de-intercalating lithium ion ($Li^+$), a material capable of reacting with lithium ion to reversibly form lithium containing compounds, lithium metal, or lithium alloy. The material capable of reversibly intercalating or de-intercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The negative electrode may further include a binder for bonding of the negative electrode active material and the electrically conductive material and for bonding to the current collector. Specifically, the binder is the same as described above for the binder of the positive electrode.

Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al, and Sn.

Separator

The conventional separator can be interposed between the positive electrode and the negative electrode. The separator is a physical separator having a function of physically separating electrodes. Any separator can be used without any particular limitations as long as it is used as a conventional separator. Particularly, a separator with excellent humidification ability for the electrolyte solution while exhibiting low resistance to ion migration of electrolyte solution is preferable.

In addition, the separator enables the lithium ion to be transported between the positive electrode and the negative electrode while separating or insulating the positive electrode and the negative electrode from each other. Such separator may be made of porous and nonconductive or insulating material. The separator may be an independent member such as a film, or may be a coating layer added to the positive and/or negative electrodes.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used alone or in a laminate thereof, or a conventional porous nonwoven fabric, for example, a nonwoven fabric made of glass fiber, polyethyleneterephthalate fiber or the like with high melting point can be used, but are not limited thereto.

Electrolyte

The electrolyte solution according to the present invention is a non-aqueous electrolyte solution containing lithium salt and is composed of lithium salt and a solvent wherein the solvent may be a non-aqueous organic solvent. An organic solid electrolyte and an inorganic solid electrolyte, etc. can be used.

The lithium salt is a substance which can be easily dissolved in a non-aqueous organic solvent, and for example, may be at least one selected from the group consisting of LiCl, LiBr, LiI, $LiClO_4$, $LiBF_4$, $LiB_{10}Cl_{10}$, $LiB(Ph)_4$, $LiC_4BO_8$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, $LiN(C_2F_5SO_2)_2$, $LiN(SO_2F)_2$, lithium chloroborane, lithium lower aliphatic carboxylate, lithium tetraphenyl borate, and lithium imide.

The concentration of the lithium salt may be 0.1 to 4.0 M, preferably 0.5 to 2.0 M depending on various factors such as the exact composition of the electrolyte solution mixture, the solubility of the salt, the conductivity of the dissolved salt, the charging and discharging conditions of the battery, the operating temperature, and other factors known in the lithium-sulfur battery field. If the concentration of the lithium salt is less than the above range, the conductivity of the electrolyte solution may be lowered and thus the performance of the battery may be deteriorated. If the concentration of the lithium salt exceeds the above range, the viscosity of the electrolyte solution may be increased and thus the mobility of the lithium ion ($Li^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, 1-ethoxy-2-methoxyethane, tetraethyleneglycol dimethylether, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate can be used alone or in a mixed solvent form of two or more solvents thereof.

As the organic solid electrolyte, preferably, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers including ionic dissociation groups and the like can be used.

As the inorganic solid electrolyte of the present invention, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be preferably used.

The non-aqueous electrolyte solution for the lithium-sulfur battery of the present invention may further comprise nitric acid or nitrous acid-based compounds as an additive. The nitric acid or nitrous acid-based compounds have an effect of forming a stable coating on the lithium electrode and improving the charging/discharging efficiency. The nitric acid or nitrous acid-based compounds may be, but are not limited to, at least one selected from the group consisting of inorganic nitric acid or nitrous acid compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), and ammonium nitrite ($NH_4NO_2$); organic nitric acid or nitrous acid compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, and dinitrotoluene, and the combinations thereof. Preferably, lithium nitrate is used.

In addition, the non-aqueous electrolyte solution may further comprise other additives for the purpose of improving charging/discharging characteristics, flame retardancy, and the like. Examples of the additives may comprise pyridine, triethylphosphite, triethanolamine, cyclic ether, ethylene diamine, n-glyme, hexaphosphoric triamide, nitrobenzene derivatives, sulfur, quinoneimine dyes, N-substituted oxazolidinone, N, N-substituted imidazolidine, ethylene glycol dialkyl ether, ammonium salt, pyrrole, 2-methoxy ethanol, aluminum trichloride, fluoroethylene carbonate (FEC), propene sultone (PRS), vinylene carbonate (VC) and the like.

The positive electrode, the negative electrode, and the separator comprised in the lithium-sulfur battery can be prepared according to the common component and preparation method, respectively, and also the appearance of the lithium-sulfur battery is not particularly limited, but may be a cylindrical shape, a square shape, a pouch shape, or a coin shape.

Hereinafter, preferred examples are provided to help understanding of the present invention, but the following examples are merely for exemplifying the present invention, and it is apparent to those skilled in the art that various changes and modifications can be made within the scope and spirit of the present invention, and such changes and modifications are within the scope of the appended claims.

Example 1: Preparation of Sulfur-Carbon Composite 3.5 g of carbon nanotubes were mixed with 1.5 g of sulfur (Ss) and placed in a sealable container, and 3 g of ethanol (100%) was added thereto.

The sealed container (sealed stainless container) was put in an oven, and heated at 155° C. for 30 minutes to prepare a sulfur-carbon composite.

Example 2: Preparation of Sulfur-Carbon Composite 3.5 g of carbon nanotubes were mixed with 1.5 g of sulfur (Ss) and placed in a sealable container, and 3 g of 2-methyl tetrahydrofuran was added thereto.

The sealed container was put in an oven, and heated at 155° C. for 30 minutes to prepare a sulfur-carbon composite.

Example 3: Preparation of Sulfur-Carbon Composite 3.5 g of carbon nanotubes were mixed with 3.5 g of sulfur (Ss) and placed in a sealable container, and 3 g of water was added thereto.

The sealed container was put in an oven, and heated at 155° C. for 30 minutes to prepare a sulfur-carbon composite.

Comparative Example 1: Preparation of Sulfur-Carbon Composite

A sulfur-carbon composite was prepared in the same manner as in Example 1, except for not adding ethanol.

Example 4: Preparation of Positive Electrode for Lithium-Sulfur Battery 88.0 wt. % of the sulfur-carbon composite prepared in Example 1, 5.0 wt. % of the conductive material, and 7.0 wt. % of the binder were mixed with distilled water to prepare a composition for forming an active material layer. The composition was coated on an aluminum current collector with 6 mg/cm$^2$ to prepare a conventional positive electrode.

Comparative Example 2: Preparation of Positive Electrode for Lithium-Sulfur Battery A positive electrode for a lithium-sulfur battery was prepared in the same manner as in Example 4, except that the sulfur-carbon composite prepared in Comparative Example 1 was used instead of the sulfur-carbon composite prepared in Example 1.

Example 5: Manufacture of Lithium-Sulfur Battery

A coin cell of a lithium-sulfur battery was manufactured by using polyethylene as a separator together with the positive electrode prepared in Example 4 and using a lithium foil having a thickness of 150 μm as a negative electrode. At this time, in the coin cell, an electrolyte solution prepared by dissolving 1M LiFSI and 1% by weight of $LiNO_3$ in an organic solvent composed of diethylene glycol dimethyl ether and 1,3-dioxolane (DEGDME:DOL=6:4 (volume ratio)) was used.

Comparative Example 3: Manufacture of Lithium-Sulfur Battery

A lithium-sulfur battery was manufactured in the same manner as in Example 5, except that the sulfur-carbon composite prepared in Comparative Example 2 was used instead of the sulfur-carbon composite prepared in Example 3.

Experimental Example 1: Confirmation of the Structure of Sulfur-Carbon Composite The structure of the sulfur-carbon composites prepared in Examples 1 and 2 was photographed by SEM to confirm the difference in structure. The SEM image taken is shown in FIG. 1. According to FIG. 1, when the 2-methyl tetrahydrofuran having high solubility of S is used, it is also confirmed that the shape of the S/C composite is changed.

Experimental Example 2: Initial Capacity Test of Lithium-Sulfur Battery

For the coil cells manufactured in Examples 5 and Comparative Example 3, the capacity from 1.8 to 2.5 V was measured using a charge and discharge measuring device. In addition, the discharge capacity and the coulomb efficiency were measured by performing a cycle of charging at 0.1 C rate CC/CV and sequentially discharging at 0.1 C rate CC (CC: Constant Current, CV: Constant Voltage). The results are shown in FIG. 2.

As shown in FIG. 2, the lithium-sulfur battery of Example 5 was confirmed to have an excellent initial capacity as compared to the lithium-sulfur battery of Comparative Example 3.

The invention claimed is:

1. A sulfur-carbon composite, wherein the sulfur is coated on the surface of carbon nanotube particles uniformly by melt diffusion process of a sulfur, wherein the sulfur-carbon composite is prepared by a method comprising the steps of:

(a) mixing carbon nanotube particles with sulfur particles or sulfur compound particles to prepare a sulfur-carbon mixture;

(b) placing the sulfur-carbon mixture mixed in step (a) and ethanol into a sealable container; and (c) heating the sealed container to a temperature of 120 to 200° C. to vaporize ethanol and provide a reaction atmosphere comprising ethanol during the melting process of sulfur and form the sulfur-carbon composite, wherein ethanol in step (c) is present in an amount of 10 parts by weight to 300 parts by weight based on 100 parts by weight of the sulfur-carbon mixture.

2. The sulfur-carbon composite according to claim 1, wherein in step (c), a heating time is 10 minutes to 3 hours.

3. The sulfur-carbon composite according to claim 1, wherein a mixing ratio by weight of the carbon nanotube particles and the sulfur particles, or the carbon nanotube particles and the sulfur compound particles is 1:1 to 1:9.

4. A positive electrode for a lithium secondary battery comprising the sulfur-carbon composite of claim 1.

5. A lithium secondary battery comprising the positive electrode of claim 4; a negative electrode; a separator; and an electrolyte.

* * * * *